United States Patent
Zhang et al.

(10) Patent No.: US 11,254,358 B2
(45) Date of Patent: Feb. 22, 2022

(54) STEERING KNUCKLE

(71) Applicant: Hubei Tri-Ring Forging Co., Ltd., Xiangyang (CN)

(72) Inventors: Yunjun Zhang, Xiangyang (CN); Jie Yang, Xiangyang (CN); Tianfu Chen, Xiangyang (CN); Wanbing Gan, Xiangyang (CN); Mingwei Huang, Xiangyang (CN); Yang Yan, Xiangyang (CN); Guowen Wang, Xiangyang (CN); Guolin Yu, Xiangyang (CN); Changbing Zuo, Xiangyang (CN); Zhanbing Wang, Xiangyang (CN)

(73) Assignee: HUBEI TRI-RING FORGING CO., LTD., Xiangyang (CN)

( * ) Notice: Subject to any disclaimer, the term of this patent is extended or adjusted under 35 U.S.C. 154(b) by 0 days.

(21) Appl. No.: 16/831,790

(22) Filed: Mar. 26, 2020

(65) Prior Publication Data
US 2020/0223479 A1    Jul. 16, 2020

Related U.S. Application Data

(63) Continuation-in-part of application No. PCT/CN2018/073944, filed on Jan. 24, 2018.

(30) Foreign Application Priority Data

Sep. 27, 2017 (CN) .......................... 201710885583.4

(51) Int. Cl.
*B62D 7/18* (2006.01)
*B21K 7/12* (2006.01)

(52) U.S. Cl.
CPC . *B62D 7/18* (2013.01); *B21K 7/12* (2013.01)

(58) Field of Classification Search
CPC .................................... B62D 7/18; B21K 7/12
USPC ..................................................... 280/93.512
See application file for complete search history.

(56) References Cited

U.S. PATENT DOCUMENTS

| | | | |
|---|---|---|---|
| 6,419,250 B1 * | 7/2002 | Pollock | B21K 1/74 280/93.512 |
| 6,499,752 B1 * | 12/2002 | Davis | B60G 9/00 280/93.512 |
| 6,616,156 B1 * | 9/2003 | Dudding | B62D 7/18 280/93.512 |
| 7,862,058 B2 * | 1/2011 | Bubulka | B60B 35/08 280/93.512 |

(Continued)

*Primary Examiner* — Toan C To
(74) *Attorney, Agent, or Firm* — Matthias Scholl P.C.; Matthias School

(57) ABSTRACT

A steering knuckle, including a rod part, a disc part, an ear part including a first ear and a second ear. The rod part and the ear part are disposed on two sides of the disc part, respectively. The first ear is longer than the second ear. The first ear and the second ear each include a pin hole; the connection line of two pin holes of the first ear and the second ear is perpendicular to the axis of the rod part. The first ear extends parallel to the axis of the rod part in the direction away from the disc part to form a pulling arm configured to connect to a steering drag link. The second ear extends perpendicularly to the axis of the rod part and perpendicularly to the connection line of the two pin holes to form a steering arm configured to connect to a steering tie rod.

8 Claims, 4 Drawing Sheets

(56) References Cited

U.S. PATENT DOCUMENTS

| | | | | |
|---|---|---|---|---|
| 8,469,378 B1* | 6/2013 | Bodary | .................... | B62D 7/18 |
| | | | | 280/93.512 |
| 9,096,259 B2* | 8/2015 | Varela | ...................... | B62D 7/18 |
| 9,637,168 B2* | 5/2017 | Bloink | .................... | B62D 7/18 |
| 10,421,488 B2* | 9/2019 | Lam | ......................... | B62D 7/18 |
| 2007/0273119 A1* | 11/2007 | Stoia | ........................ | B62D 7/18 |
| | | | | 280/93.512 |
| 2013/0119628 A1* | 5/2013 | Deierling | ................. | B62D 7/18 |
| | | | | 280/93.512 |
| 2015/0232123 A1* | 8/2015 | Lam | ........................ | B62D 7/18 |
| | | | | 280/93.512 |
| 2018/0066720 A1* | 3/2018 | Dilworth | ............. | F16D 65/0056 |

\* cited by examiner

STEERING KNUCKLE

CROSS-REFERENCE TO RELATED APPLICATIONS

This application is a continuation-in-part of International Patent Application No. PCT/CN2018/073944 with an international filing date of Jan. 24, 2018, designating the United States, now pending, and further claims foreign priority benefits to Chinese Patent Application No. 201710885583.4 filed Sep. 27, 2017. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a steering knuckle.

In automotive suspension, a steering knuckle is that part which contains the wheel hub or spindle, and attaches to the suspension and steering components. It is variously called a steering knuckle, spindle, upright or hub, as well.

SUMMARY

Provided is a steering knuckle, comprising a rod part, a disc part, and an ear part comprising a first ear and a second ear. The rod part and the ear part are disposed on two sides of the disc part, respectively. The first ear is longer than the second ear; the first ear and the second ear each comprise a pin hole; a connection line of two pin holes of the first ear and the second ear is perpendicular to an axis of the rod part. The first ear extends parallel to the axis of the rod part in a direction away from the disc part to form a pulling arm configured to connect to a steering drag link. The second ear extends perpendicularly to the axis of the rod part and perpendicularly to the connection line of the two pin holes to form a steering arm configured to connect to a steering tie rod.

The pulling arm comprises a free end opposite to the pin hole, and the free end comprises a taper hole to receive the steering drag link.

The steering arm comprises a bending end opposite to the pin hole, and the bending end comprises a connection hole to receive the steering tie rod.

The disc part comprises a mounting hole to receive a braking device, and a central line of the mounting hole is parallel to the axis of the rod part.

The pulling arm is symmetrical with respect to a plane decided by the connection line of the two pin holes and the axis of the rod part.

The sectional area of the pulling arm decreases in a direction from the pin hole of the first ear to the free end.

The density of the steering arm decreases in the direction from the pin hole of the second ear to the bending end.

The density of the pulling arm is less than the density of the first ear; and a density of the steering arm is less than the density of the second ear.

Also provided is a method of producing the steering knuckle, the method comprising: upsetting part of a billet to form the disc part; forging one end of the disc part to form the rod part; flattening another end of the disc part, preforging, distributing materials, forging to form a workpiece comprising two straight arms; horizontally placing the workpiece into a bending die under a hot state, where the two straight arms are on one horizontal plane; rotating one of the two straight arms by 90 degrees, bending the one of the two straight arms to form the steering arm and calibrating a curvature of the steering arm; forging the other straight arm to yield the pulling arm.

The steering arm comprises an upper surface and a lower surface with respect to the disc part; the steering arm has a neutral layer where the strain is equal to zero during the bending of the steering arm; a distance between the neutral layer and the upper surface is M, and a distance between the neutral layer and the lower surface is N; after the one of the two straight arms is bent to form the steering arm, M is reduced by 5-10%, and N is increased by 5-15%.

DETAILED DESCRIPTIONS

To further illustrate, embodiments detailing a steering knuckle are described below. It should be noted that the following embodiments are intended to describe and not to limit the disclosure.

Figure 1:
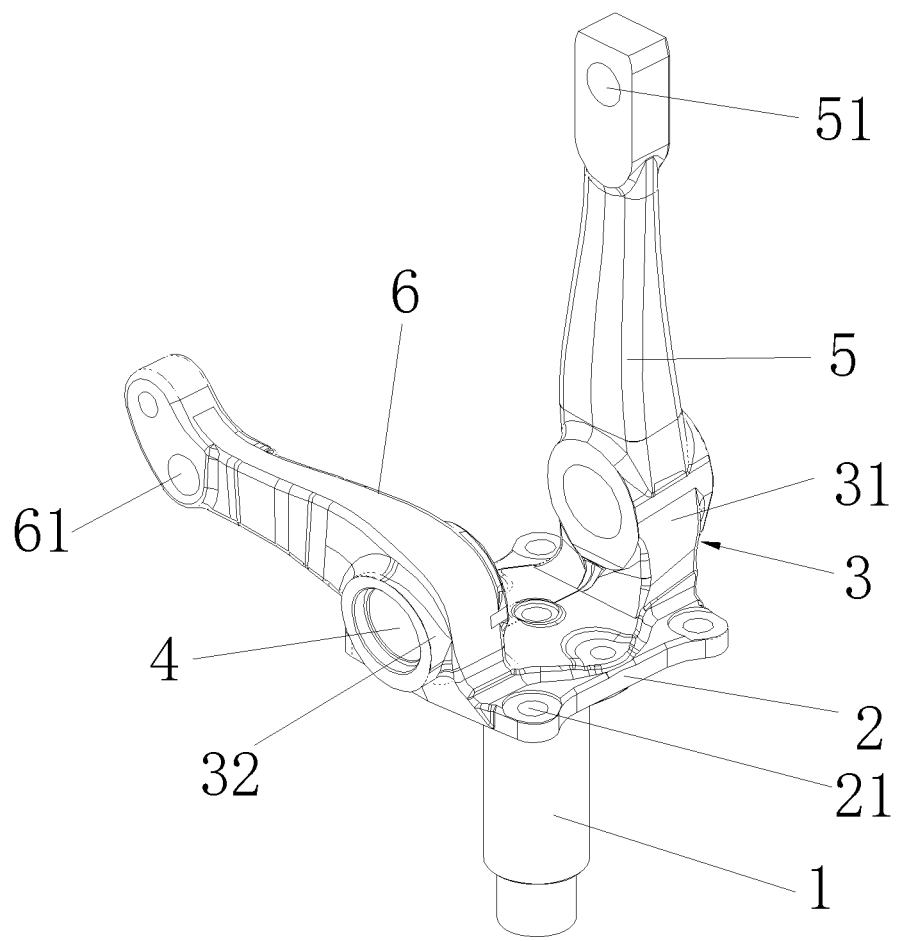
FIG. 1 shows a steering knuckle according to one embodiment of the disclosure.
Figure 2:
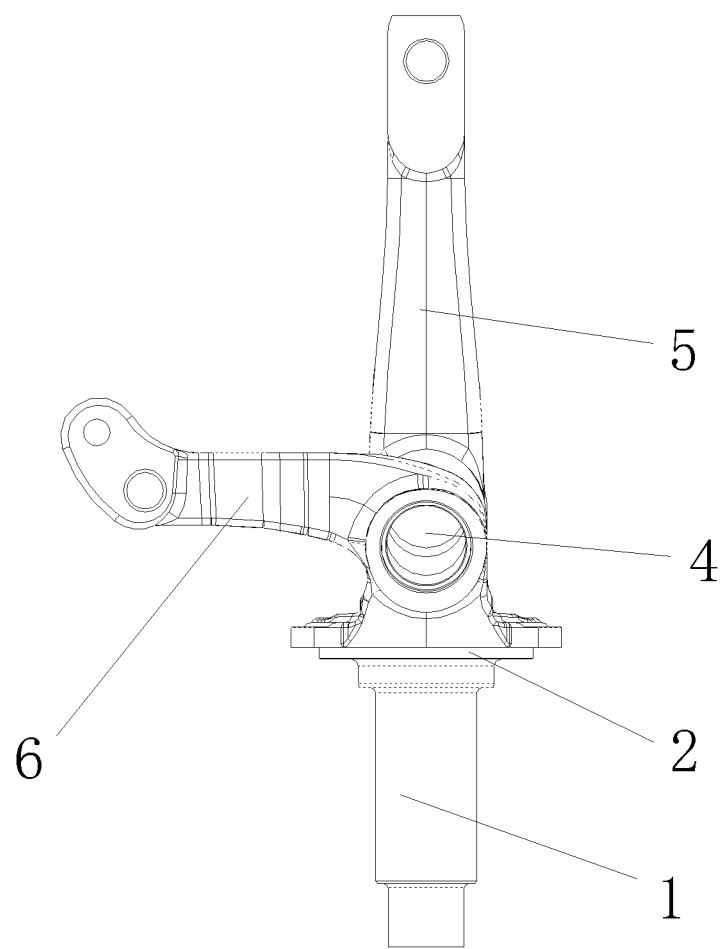
FIG. 2 shows a steering knuckle according to another embodiment of the disclosure.
Figure 3:
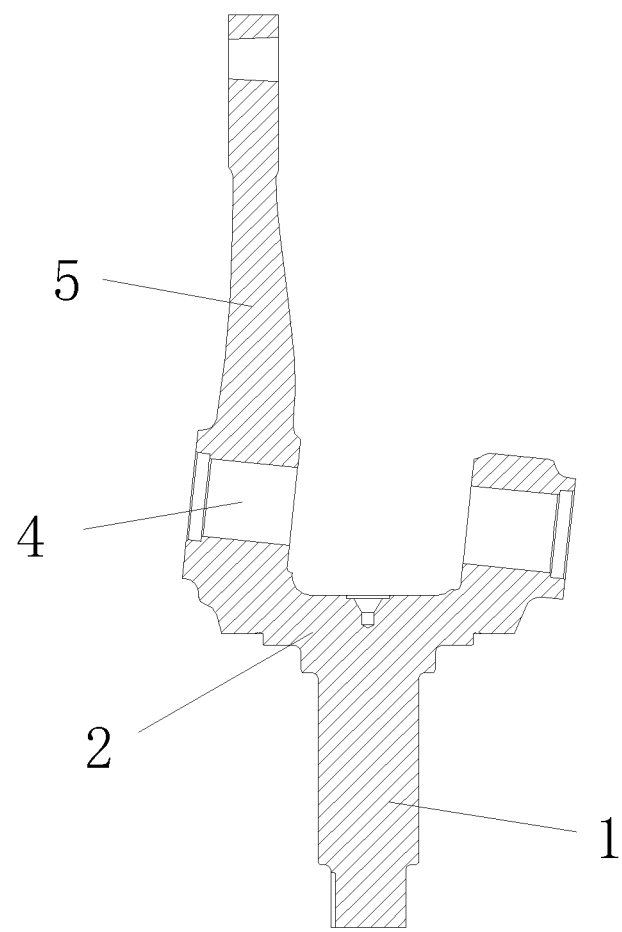
FIG. 3 is sectional view of the steering knuckle in FIG. 2.
Figure 4:
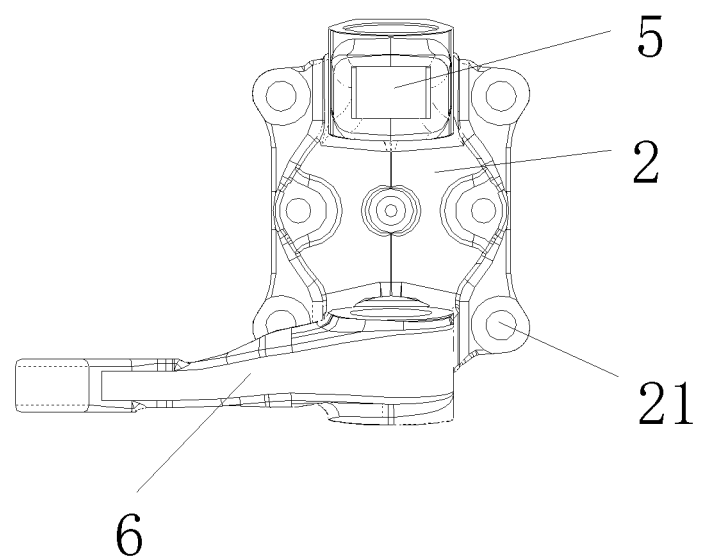
FIG. 4 is top view of the steering knuckle in FIG. 2.

As shown in FIGS. 1-4, a steering knuckle comprises a rod part 1, a disc part 2, and an ear part 3. The ear part 3 comprises a first ear 31 and a second ear 32. The first ear 31 is longer than the second ear 32. The rod part and the ear part are disposed on two sides of the disc part, respectively. The first ear 31 and the second ear 32 each comprise a pin hole 4. The connection line of two pin holes of the first ear 31 and the second ear 32 is perpendicular to the axis of the rod part 1. The first ear extends parallel to the axis of the rod part 1 in a direction away from the disc part 2 to form a pulling arm 5 configured to connect to a steering drag link; the second ear extends perpendicularly to the axis of the rod part 1 and perpendicularly to the connection line of the two pin holes to form a steering arm 6 configured to connect to a steering tie rod. The steering knuckle is an integrated structure. As shown in FIG. 1, the pulling arm 5 and the first ear 31 combine to form a straight arm. The steering arm 6 and the second ear 32 combine to form a bending arm. The bending arm is formed by forging and deforming a billet obtain a bent shape. In the forging process, the rod part, the disc part and two ears of the steering knuckle are formed. The bending arm is formed using a bending correction process, which can be realized by a bending correction die. In the machining stage, the two ears are first vertical to the disc part, which is convenient for the cutter to extend into the ear part and the disc part for machining.

Compared with the prior art, one advantage of the steering knuckle is that the pulling arm 5 and the steering arm 6 are directly integrated with the disc part, reducing the connection parts. The pulling arm 5 and the steering arm 6 are connected with other parts, thereby simplifying the structure of the automobile steering system, obtaining a new type of steering knuckle with lightweight structure without damaging the mechanical properties. Compared with the prior art, the weight of the steering knuckle can be reduced.

The pulling arm 5 comprises a free end opposite to the pin hole, and the free end comprises a taper hole 51 to receive the steering drag link.

The steering arm 6 comprises a bending end opposite to the pin hole, and the bending end comprises a connection hole 61 to receive the steering tie rod.

The disc part 2 comprises a mounting hole 21 to receive a braking device, and a central line of the mounting hole 21 is parallel to the axis of the rod part 1.

The pulling arm 5 is symmetrical with respect to the plane decided by the connection line of the two pin holes 4 and the axis of the rod part 1. This facilitates the formation of the pulling arm 5 and the steering arm 6.

The sectional area of the pulling arm 5 decreases in the direction from the pin hole of the first ear to the free end. Thus, the distance between the two ears are enlarged, and the weight of the steering knuckle is reduced.

The density of the steering arm 6 decreases in a direction from the pin hole of the second ear to the bending end. Thus, the strength of the steering arm 6 is enhanced and can meet the requirements for bending the arm after being forged.

The density of the pulling arm 5 is less than the density of the first ear 31; and the density of the steering arm 6 is less than the density of the second ear 31.

A method of producing the steering knuckle comprises upsetting part of a billet to form the disc part 2; forging one end of the disc part 2 to form the rod part 1; flattening another end of the disc part 2, preforging, distributing materials, forging to form a workpiece comprising two straight arms; horizontally placing the workpiece into a bending die under a hot state, where the two straight arms are on one horizontal plane; rotating one of the two straight arms by 90 degrees, bending the one of the two straight arms to form the steering arm 6 and calibrating a curvature of the steering arm; forging the other straight arm to yield the pulling arm 5. During the processing, the ear part is first processed into two straight arms. Because there are no other connecting devices in the ear part, the ear part is convenient for forging. In the pre-forging and final forging stages, the steering knuckle is divided into three parts, that is, the rod part 1, the disk part 2 and the ear part 3, along the axial direction of the rod part 1. The ear part 3 comprises two straight arms having a relatively regular surface shape, so it is easy to forge. Then, one of the two straight arms is bent into a steering arm, which is easy to operate.

Specifically, the steering arm 6 comprises an upper surface and a lower surface with respect to the disc part; the steering arm 6 has a neutral layer where the strain is equal to zero during the bending of the steering arm; the distance between the neutral layer and the upper surface is M, and the distance between the neutral layer and the lower surface is N; after the one of the two straight arms is bent to form the steering arm 6, M is reduced by 5-10%, and N is increased by 5-15% compared with the original value. In the process of bending, the upper surface becomes thinner in tension, the lower surface becomes denser in compression, and the smaller the density of the upper surface, and the bigger the density of the lower surface. To ensure the bended product meets the requirements, the mold cavity corresponding to the steering arm 6 in the finisher is modified as needed.

The bending angle of the one of the two straight arms is less than 90° in the bending die.

In the pre-forging and forging stages, the shape of the free ends of the two straight arms is unchanged. In the process of bending, the free ends of the two straight arms are deformed.

In the pre-forging stage, first, the metal accumulated in the ear part is divided, and then the two straight arms are formed by extrusion of the metal in the forging stage.

It will be obvious to those skilled in the art that changes and modifications may be made, and therefore, the aim in the appended claims is to cover all such changes and modifications.

What is claimed is:

1. A steering knuckle, comprising:
a rod part;
a disc part; and
an ear part comprising a first ear and a second ear;
wherein:
the rod part and the ear part are disposed on two sides of the disc part, respectively;
the first ear is longer than the second ear; the first ear and the second ear each comprise a pin hole; a connection line of two pin holes of the first ear and the second ear is perpendicular to an axis of the rod part;
the first ear extends parallel to the axis of the rod part in a direction away from the disc part to form a pulling arm;
the second ear extends perpendicularly to the axis of the rod part and perpendicularly to the connection line of the two pin holes to form a steering arm;
the pulling arm is symmetrical with respect to a plane decided by the connection line of the two pin holes and the axis of the rod part; and
a density of the steering arm decreases in a direction from the pin hole of the second ear to the bending end.

2. The steering knuckle of claim 1, wherein the pulling arm comprises a free end opposite to the pin hole, and the free end comprises a taper hole.

3. The steering knuckle of claim 1, wherein the steering arm comprises a bending end opposite to the pin hole, and the bending end comprises a connection hole.

4. The steering knuckle of claim 1, wherein the disc part comprises a mounting hole to receive a braking device, and a central line of the mounting hole is parallel to the axis of the rod part.

5. The steering knuckle of claim 1, wherein a sectional area of the pulling arm decreases in a direction from the pin hole of the first ear to the free end.

6. A steering knuckle, comprising:
a rod part;
a disc part; and
an ear part comprising a first ear and a second ear;
wherein:
the rod part and the ear part are disposed on two sides of the disc part, respectively;
the first ear is longer than the second ear; the first ear and the second ear each comprise a pin hole; a connection line of two pin holes of the first ear and the second ear is perpendicular to an axis of the rod part;
the first ear extends parallel to the axis of the rod part in a direction away from the disc part to form a pulling arm;
the second ear extends perpendicularly to the axis of the rod part and perpendicularly to the connection line of the two pin holes to form a steering arm;
the pulling arm is symmetrical with respect to a plane decided by the connection line of the two pin holes and the axis of the rod part; and
a density of the pulling arm is less than a density of the first ear; and a density of the steering arm is less than a density of the second ear.

7. A method of producing the steering knuckle of claim 1, comprising:

upsetting part of a billet to form the disc part;

forging one end of the disc part to form the rod part;

flattening another end of the disc part, preforging, distributing materials, and forging to form a workpiece comprising two straight arms;

horizontally placing the workpiece into a bending die under a hot state, where the two straight arms are on one horizontal plane;

rotating one of the two straight arms by 90 degrees, bending the one of the two straight arms to form the steering arm and calibrating a curvature of the steering arm; and forging the other straight arm to yield the pulling arm.

8. The method of claim 7, wherein the steering arm comprises an upper surface and a lower surface with respect to the disc part; the steering arm has a neutral layer where the strain is equal to zero during the bending of the steering arm; a distance between the neutral layer and the upper surface is M, and a distance between the neutral layer and the lower surface is N; after the one of the two straight arms is bent to form the steering arm, M is reduced by 5-10%, and N is increased by 5-15%.

* * * * *